United States Patent [19]

Downing, Jr.

[11] Patent Number: 5,499,685
[45] Date of Patent: Mar. 19, 1996

[54] STRIP TILLAGE SOIL CONDITIONER APPARATUS AND METHOD

[76] Inventor: James H. Downing, Jr., P.O. Box 1147, Louisa, Va. 23093

[21] Appl. No.: 90,371

[22] Filed: Jul. 13, 1993

[51] Int. Cl.⁶ .............................. A01B 49/02; A01C 5/00
[52] U.S. Cl. .............. 172/699; 111/52; 111/140; 172/151
[58] Field of Search .................... 111/52, 139, 140, 111/141, 142–150; 172/134–137, 146, 156, 166, 176, 196, 459, 699

[56] References Cited

U.S. PATENT DOCUMENTS

| | | |
|---|---|---|
| 481,242 | 8/1892 | Nugent . |
| 1,823,244 | 9/1931 | White . |
| 2,629,351 | 11/1946 | Wenger . |
| 2,739,549 | 3/1956 | Taylor . |
| 3,491,709 | 1/1970 | Fleischer et al. . |
| 3,501,706 | 3/1970 | Lind et al. . |
| 3,673,970 | 3/1970 | Hatcher . |
| 3,742,877 | 7/1973 | Coffee . |
| 4,055,126 | 10/1977 | Brown et al. . |
| 4,108,089 | 7/1978 | van der Lely . |
| 4,141,302 | 2/1979 | Morrison, Jr. et al. . |
| 4,191,262 | 3/1980 | Sylvester . |
| 4,211,175 | 7/1980 | van der Lely . |
| 4,212,254 | 7/1980 | Zumbahlen . |
| 4,213,408 | 7/1980 | West et al. ............ 172/156 X |
| 4,241,674 | 12/1980 | Mellinger . |
| 4,267,783 | 5/1981 | Hendrix et al. . |
| 4,285,284 | 10/1981 | van der Lely ............ 111/190 X |
| 4,377,979 | 3/1983 | Peterson et al. . |
| 4,425,857 | 1/1984 | Lienemann et al. . |
| 4,426,940 | 1/1984 | Brian et al. . |
| 4,453,601 | 6/1984 | Orthman et al. . |
| 4,596,200 | 6/1986 | Cafford et al. . |
| 4,601,248 | 7/1986 | Beasley . |
| 4,607,580 | 8/1986 | Monty, Jr. . |
| 4,611,545 | 9/1986 | Nickeson et al. . |
| 4,624,196 | 11/1986 | Anderson . |
| 4,624,197 | 11/1986 | Drake . |
| 4,671,193 | 6/1987 | States . |
| 4,750,441 | 6/1988 | Pfenningen et al. ............ 111/140 X |
| 5,076,180 | 12/1991 | Schneider ................ 111/139 |
| 5,129,282 | 7/1992 | Bassett et al. ............ 111/139 |
| 5,255,617 | 10/1993 | William et al. ............ 111/140 |
| 5,333,694 | 10/1994 | Roggenbuck et al. ........... 172/156 |

FOREIGN PATENT DOCUMENTS

| | | |
|---|---|---|
| 2528930 | 1/1977 | Germany . |
| 3501706 | 7/1985 | Germany . |

OTHER PUBLICATIONS

Farm Journal/Mid–Jan., 1993, "Listen to your soil", by Charlene Finck.
"This New Rig Designed For Rough, Trashy Conditions" Reprinted from No–Till Farmer; Nov., 1987.
Farm Show, Aug. 1987 Issue; "One–Pass Till–Planter" for Rocky, Trashy Soil.
Farm Show, Mar. 1993; by Darrell Smith "No–till achieved!".

*Primary Examiner*—Randolph A. Reese
*Assistant Examiner*—Robert Pezzuto
*Attorney, Agent, or Firm*—Cushman Darby & Cushman

[57] ABSTRACT

A movable, row crop soil conditioner apparatus for conditioning soil prior to planting including a mechanism for first cutting a row length furrow opening in the soil when the soil conditioner is moved. A subsoiler is positioned behind the first cutting mechanism. It is selectively inserted into the furrow opening when the subsoiler is moved. The subsoiler includes a tooth, and a first pressure applicator for maintaining pressure on the soil directly and laterally on the subsoiler tooth when the tooth is inserted into the furrow opening. The tooth causes an eruption furrow in the furrow opening. The pressure applicator then controls the eruption soil wakes on either side of the subsoiler when the row crop conditioner is moved down a row. The subsoiler also includes a mechanism for turning the soil wakes on either side of the furrow inwardly towards each other to crush and shear the soil and to urge it downwardly into the eruption furrow, thereby closing the eruption furrow. A crop residue in the soil wakes is inserted downwardly into the eruption furrow to subsequently function as a wick and to pull moisture into the planted conditioned soil.

33 Claims, 4 Drawing Sheets

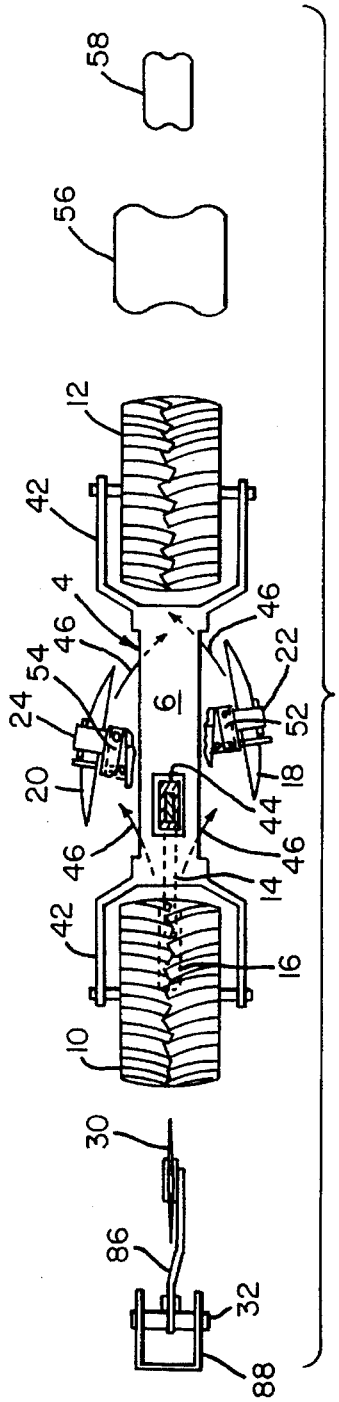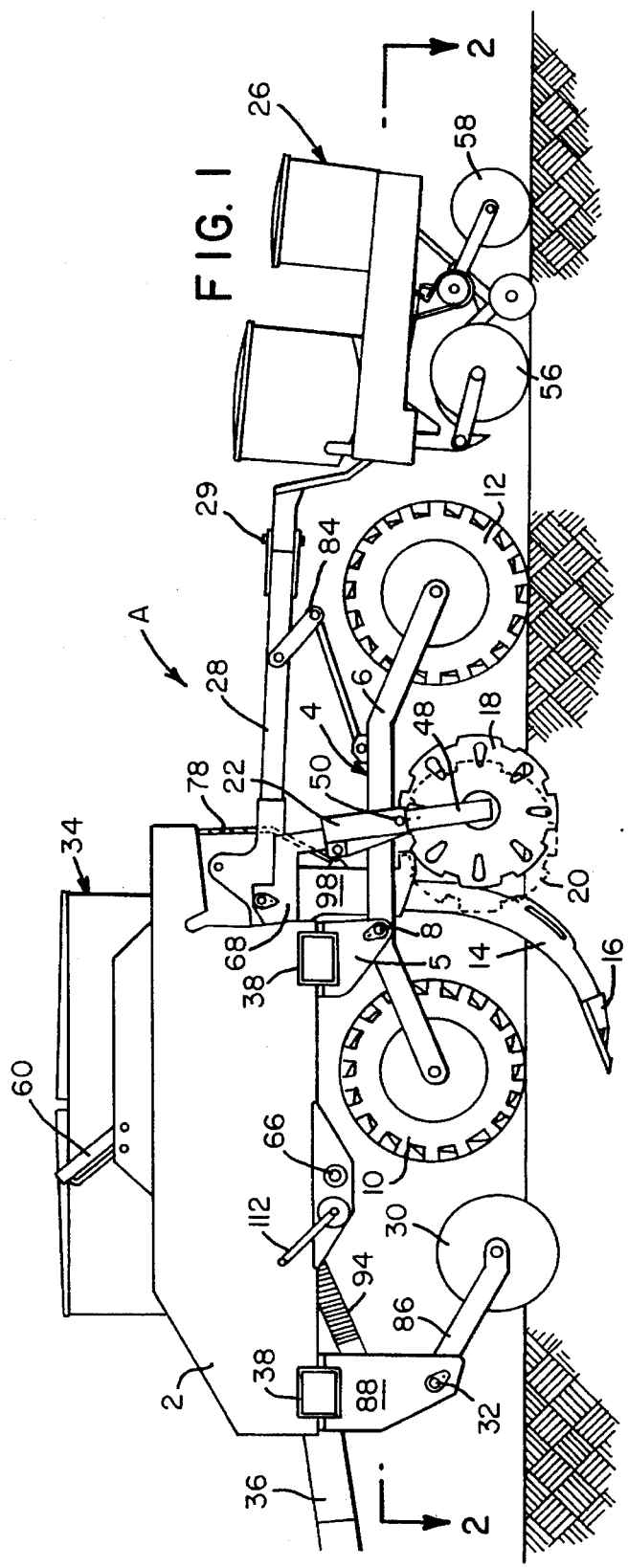

STRIP TILLAGE SOIL CONDITIONER APPARATUS AND METHOD

FIELD OF THE INVENTION

The present invention relates to an integrated apparatus and method for conditioning soil and planting certain crops and more particularly to an apparatus which only conditions the soil in the plant row.

BACKGROUND OF THE INVENTION

In modern agriculture, soil is often worked or conditioned prior to planting to ensure an optimum environment in which the seeds can germinate and grow. The desired result is a high crop yield. "Conditioning" of the soil generally refers to breaking up of hardpacked soil followed by intermixing of the broken soil to overturn crop residue or other debris thereby creating a loose friable seedbed in which to plant. Conditioned soil provides a better environment for seed growth and promotes good soil-seed contact through which moisture and nutrients will flow.

Although wholesale conditioning of the entire field prior to planting is often practiced, heavily worked or overly conditioned land is prone to depletion of soil moisture and nutrient loss via erosion. More recently, conservation farming techniques have come into use to restrict tillage to only those areas of the soil which are to be planted. These methods are broadly referred to as minimal tillage or "no-till" farming and comprise conditioning of the soil and making a small opening for seed with reduced plowing. Although such no-till methods reduce soil erosion, they fail to sufficiently condition the soil for optimum seed germination and therefore crop yields are low. Since sides of the seedbeds are often left unworked, they insufficiently filter water and nutrients therethrough.

Whereas conventional operations required several passes through the field, one to till the ground, second to introduce fertilizer or compact the ground and a third to plant the seed, minimal tillage operations accomplish these discrete operations in a single pass. However the machines are unduly heavy and cumbersome. Further, since a number of separate operations such as planting, fertilizing and conditioning are combined within a single device, the agricultural implementation of that combination tends to become overly elongated, difficult to control, and extremely heavy. The weight of the overall machine often re-compacts the soil which has been conditioned. Also, combining a number of separate soil working implements onto a single machine tends to reduce the efficiency of each of the individual implements. For example, very often the machine is so large and heavy that the soil is insufficiently broken up and the seedbed is irregular or excessively compacted along the sides. When traversing rough or uneven ground the rigid nature of the prior art devices fail to compensate creating furrows or seedbeds which are nonuniform in depth.

In addition, overly long prior art no-till devices tend to accumulate trash or other crop residue and debris as it hangs up in front of the various subsoilers or coulter disks. The machine must be repeatedly stopped to allow manual removal of the debris. Finally, prior art devices tend to hang up when the subsoiler strikes an underground obstruction such as a rock or stump. In such situations the machine must be backed up to free the subsoiler of the underground debris resulting in a loss of time.

A need has therefore existed within the art which overcomes the disadvantages inherent in both conventional tillage practices as well as no-till practices.

OBJECTS AND SUMMARY OF THE INVENTION

With the foregoing in mind, it is an object of the present invention to provide an improved soil conditioning device to strip tillage a row length to produce a strip or narrow row of loose, friable, granular and flowable soil for optimum seed germination and plant growth.

A further object of the present invention is to provide a strip tillage device for conditioning soil which only treats the soil within a planted row and thereby conforms with soil conservation practices.

A still further object of the present invention is to provide a strip tillage device for conditioning soil which creates a seedbed that retains water and increases filtration through the soil better than seedbeds produced by prior art devices.

Yet another object of the present invention is to provide a integrated soil conditioning apparatus which incorporates a plurality of independent field functions into a single machine of light weight and which accomplishes the separate field functions during a single pass through the field.

A still further object of the present invention is to enhance the overall efficiency of the field implements beyond what they would normally achieve had they been operated separately.

Yet another object of the present invention is to provide a soil conditioning apparatus of the strip tillage type which sufficiently packs and levels the soil to provide a uniform raised seedbed containing loose and friable soil underneath to allow rapid seed germination and provide a uniform crop stand.

A still further object of the present invention is to provide an agricultural device of the strip tillage type which allows crop residue and debris to be plowed into the soil surface as well as to be crimped into the soil thereby providing a mulch which is effective in minimizing soil moisture loss through evaporation and making the crops more drought resistant.

Yet another object of the present invention is to provide a strip tillage agricultural apparatus containing a unique suspension means that assists in creating a raised seedbed having minimal compaction of the surrounding soil to the sides of the seedbed but of a sufficiently conditioned nature so as to enhance water retention and nutrient absorbtion through the seedbed.

Yet another object of the present invention is to provide a strip tillage agricultural device which includes a unique subsoiler and coulter disk arrangement which accelerates the two separate soil streams as they pass around the subsoiler causing the soil to collide thereby enhancing mixing and loosening of the soil into a more uniform and friable loose granular mass.

Still a further object of the present invention is provide a subsoiler and coulter disk arrangement which is independently adjustable and may therefore be modified depending on the type of soil which is to be conditioned.

Still a further object of the present invention is to provide an articulated planter support bracket which allows the planter to accurately track over the conditioned seedbed during use.

A still further object of the present invention is to provide a subsoiler which will not "hang-up" during collision with underground obstructions such as boulders, rocks or the like.

Yet a further object of the present invention is to provide a device which applies fertilizer into the furrow as it is opened by the subsoiler thereby reducing fertilizer waste and pollution.

Yet another object of the present invention is to provide a conditioned soil which captures moisture better than prior art seedbeds and is thus better able to withstand the effects of extended drought.

Yet another object of the present invention is to provide a seedbed having increased oxygenation and microbe growth.

Another object of the present invention is to provide a strip tillage device for conditioning soil which is more compact than prior art devices and therefore easily transportable from site to site since the earth working elements are raised and lowered in an integrated manner.

A still further object of the present invention is to provide a strip tillage device which incorporates a unique suspension system to support the numerous earth working implements on the apparatus in a manner which distributes the weight forward of the machine making it more stable, easily maneuvered and non-damaging to the conditioned strip of soil.

Accordingly, it is an object of the present invention to provide a strip tillage agricultural implement which accomplishes a combination of operations including furrowing, mixing, smoothing of a seedbed, fertilizer application and planting in a single pass.

Still another object of the invention is to provide an agricultural implement for strip tillage which is economical to manufacture, simple yet rugged in construction and effective in operation.

A still further object of this invention is to provide a machine of the character wherein a savings in labor and fuel costs is obtained.

Another object of the present invention is to provide an agricultural implement for strip tillage whereby a number of individual row units are incorporated into a single agricultural implement to simultaneously condition the soil in plural rows and where all the individual row units are mechanically interconnected to allow remote control and adjustment of soil depth conditioning.

Yet a further object of the present invention is to provide an agricultural implement for strip tillage whereby the carrying and support means for the implement is an integral part of the tillage operation.

A still further object of the present invention is to provide an agricultural implement whereby the subsoiler and the paired coulter disks and planter each pivot independently from a single pivot.

These and other objects are accomplished in accordance with the present invention by providing a movable, row crop soil conditioner apparatus for conditioning soil prior to planting comprising a mechanism for first cutting a row length furrow opening in the soil when the soil conditioner is moved, a subsoiler mechanism means behind the first cutting mechanism and an assembly for selectively inserting a mechanism into the furrow opening when the subsoiler is moved, a first pressure applicator for maintaining pressure laterally on the soil and directly over the subsoiler mechanism when the subsoiler is inserted into the furrow opening to cause an eruption furrow in the furrow opening and to control the eruption soil wakes on either side of the subsoiler when the row crop conditioner is moved down a row, and a mechanism for turning the soil wakes on either side of the subsoiler inwardly towards each other to crush and to shear the soil and urge it downwardly into the eruption furrow, thereby closing the eruption furrow whereby crop residue in the soil wakes is inserted downwardly into the eruption furrow to subsequently function as a wick and pull moisture into the planted conditioned soil.

The present invention is also directed to a method of conditioning soil in preparation for planting including the steps of cutting a row length furrow in the soil, subsequently inserting a subsoiler into the furrow in the soil and maintaining a first pressure directly and laterally on the soil above the subsoiler to control the soil eruption wakes on either side of the subsoiler, thereby deflecting the subsoiler wakes inwardly and downwardly towards each other to condition the soil, closing the furrow to draw crop residue downwardly into the furrow to provide wicks for subsequently pulling moisture into the planted conditioned soil and maintaining moisture therein.

The present invention is also directed to a movable, row crop soil conditioner apparatus for conditioning soil prior to planting comprising a subsoiler mechanism for selectively inserting a subsoiler into the soil when the soil conditioner is moved, the subsoiler mechanism including a tooth for causing an eruption furrow opening into the soil when the subsoiler is inserted into the soil, first pressure applicator for maintaining pressure on the soil directly and laterally on the subsoiler tooth when the tooth is inserted into the soil to cause an eruption furrow opening to control the eruption soil wakes on either side of the subsoiler means when the row crop conditioner is moved down a row, and a mechanism for turning the soil wakes on either side of the subsoiler inwardly toward each other to crush and shear the soil and downwardly into the eruption furrow closing the eruption furrow, whereby crop residue is intermixed into the soil wakes and at least a portion is inserted downwardly into the eruption furrow to subsequently function as a wick to retain and pull moisture into the planted conditioned soil.

The present invention is additionally directed to a movable, row crop soil conditioner apparatus for conditioning soil prior to planting comprising a carrying device for supporting and moving the row crop soil conditioner along a row to be planted, a tillage assembly supported by the carrying device for conditioning the soil as the row crop soil conditioner moves along a row to be planted, the carrying device and the tillage assembly are longitudinally aligned to form an integral single row unit wherein the carrying device also functions as part of the soil conditioning operation while supporting and moving the row corp soil conditioner along a row to be planted.

The present invention is further directed to an integrated, movable row crop soil conditioner for conditioning soil prior to planting comprising a subsoiler mechanism to penetrate and break up the soil into soil wakes as the row crop soil conditioner is moved, a mechanism for turning the soil wakes from the subsoiler mechanism inwardly towards each other to crush and shear the soil, the mechanism for turning the soil is provided with a single pivot point about which the turning mechanism moves into and out of engagement with the soil.

BRIEF DESCRIPTION OF THE DRAWINGS

FIG. 1 is a side elevational view of the strip tillage soil conditioning apparatus of the present invention;

FIG. 2 is a fragmentary sectional view taken along line 2—2 of FIG. 1.

DETAILED DESCRIPTION OF THE PREFERRED EMBODIMENT

Figure 3:
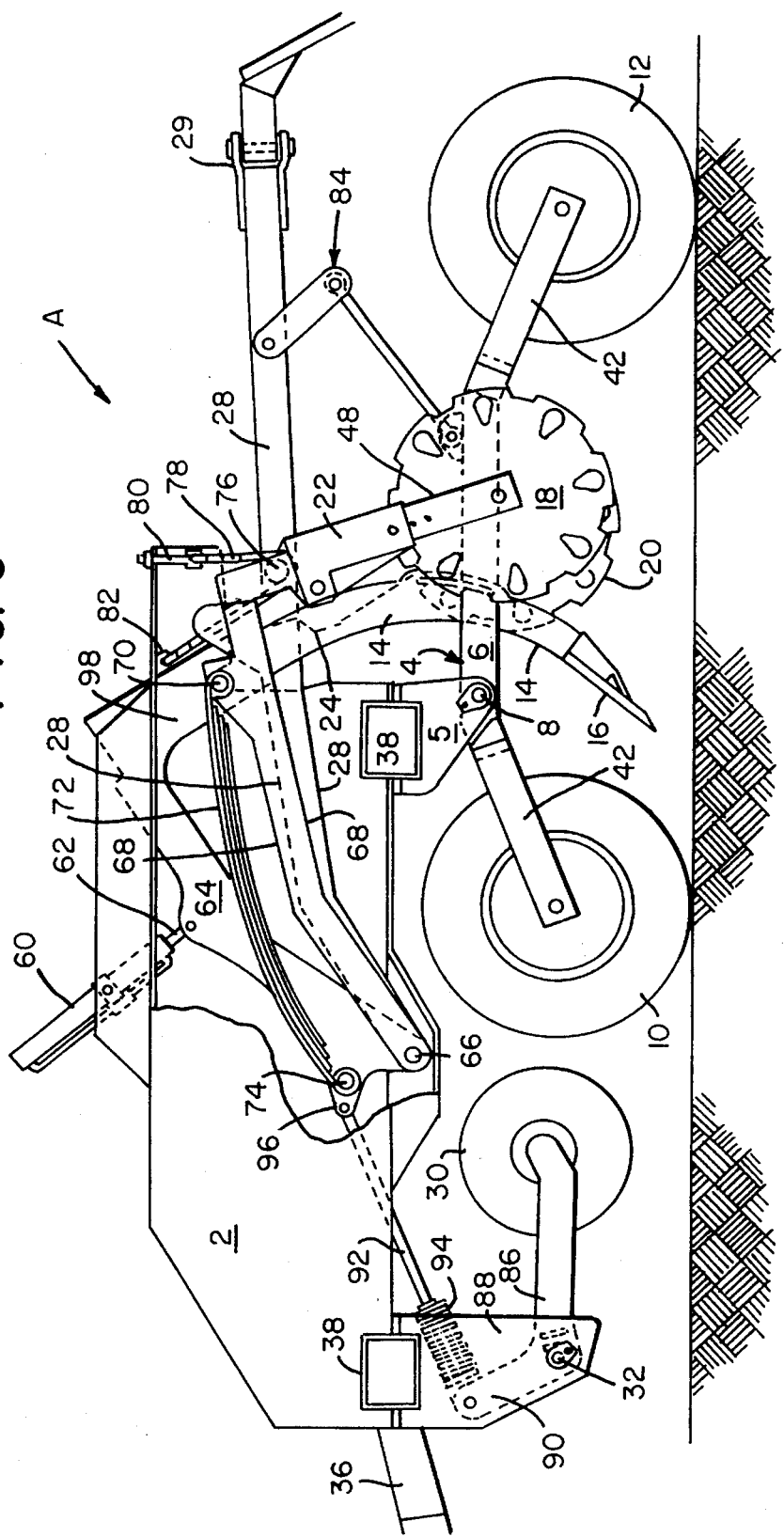
FIG. 3 is an enlarged, fragmentary side elevational view of the device shown in FIG. 1 showing the subsoiler, coulter disks and planter support means in a raised position for transport with portions shown in hidden lines.

Referring now to the drawings and more particularly to FIG. 1, there is shown the strip tillage planting apparatus of the present invention which is generally indicated at A. The strip tillage apparatus A includes a main frame 2 rotatably supported by a main suspension or carrying means generally shown as 4 comprising a walking beam 6 pivotally attached to the main frame flange 5 at main pivot 8. First pressure means 10 and second pressure means 12 comprising a pair of pressurized tires or wheels are affixed at opposite ends of the walking beam 6, to movably support the entire apparatus A. Walking beam 6 is positioned for pivotal attachment at main pivot 8. The location of main pivot 8 is such that the majority of the apparatus A weight is supported by pressure means 10. Preferably it exerts three times the weight of pressure means 12.

An extendable and retractable subsoiler shank 14 including a tooth 16 is disposed directly behind first pressure means 10. A pair of adjustable coulter disks 18 and 20 are positioned behind and adjacent to the subsoiler 14 and each are mounted on separate support brackets 22 and 24 respectively. A seed depositing and covering means 26 is attached to support bracket 28 directly behind the second pressure means 12. Support bracket 28 includes a pivot 29 to enable planter 26 to laterally track behind the tillage apparatus A. A first cutting means 30 is pivotally secured at 32 forward of the first pressure means 10. First cutting means may be a cutting disk to slice through debris such as vegetation or other trash and cut a furrow opening into the soil.

It is within the scope of the present invention to provide a means for cutting through the trash or clearing a path through the trash without also cutting an opening into the soil. For example, a "trash whipper" or "weasel" may be provided to simply clear the trash out of the path of the subsoiler 14. Alternatively, the cutting means or trash clearing means is not required at all if the soil to be conditioned does not contain debris. The subsoiler 14 and coulter disks 18 and 20 cooperate generally to provide a tillage means which includes the pressure means 10 and 12 as will be further explained below. Applicant has incorporated the carrying and support means for the apparatus into the tillage operation. A hopper and fertilizer deposit means 34 is centrally affixed to the main frame 2. The apparatus A includes a hitch or tow bar 36 adaptable to be connected to a suitable pulling apparatus such as a tractor (not shown).

Lateral linkage means 38 extends through the main frame 2 so that a number of integral single row units A may be positioned side by side while being simultaneously pulled to condition and plant individual, parallel strips or rows of soil. For example, a strip or row of conditioned and planted soil may have a width of twenty inches with a ten inch wide strip of unworked soil adjacent to it. By laterally connecting a number of individual strip tillage apparatus A, a series of parallel twenty inch strips of worked and planted soil can be produced with ten inch strips of unworked soil therebetween to improve drainage and lessen the effects of erosion. As can be appreciated, it is within the scope of the present invention to either increase or decrease the distance between the strips of conditioned and planted soil.

Turning now to FIG. 2, the alignment of the various soil conditioning elements according to the present invention can be seen. The front or first cutting disk 30 is mounted on a support arm 86 having a vertical pivot 32 affixed to the main frame extension 88 so that the arm 86 can swing laterally during turns or to bypass an underground obstructions. Immediately behind the first cutting disk 30 is first pressure means 10 rotatably mounted to fork 42 of walking beam 6. The walking beam 6 contains a vertical opening or slot 44 extending therethrough into which the subsoiler shank 14 extends. Portions of the subsoiler 14 are shown in hidden lines extending beneath the first pressure means 10. Generally speaking at least a portion of the subsoiler 14 or tooth 16 will extend under the first pressure means.

The coulter disks 18 and 20 are positioned and angled behind the subsoiler 14 to funnel and accelerate the soil which erupts over and along the sides of subsoiler shank 14 as it travels through the ground. The direction of travel of the soil around the subsoiler shank and between coulter disks 18 and 20 is generally indicated by arrows 46. Thus, the subsoiler 14, pressure means 10 and 12 and disks 18 and 20 are longitudinally aligned to form an integral single row unit. As can be appreciated, a number of integral single row units A may be laterally interconnected to provide multiple row soil conditioning. Suitable remote control means (not shown) would also be provided to allow the operator to simultaneously raise and lower the tillage mans or adjust its depth for each individual row unit. The linkage means (not shown) between each row unit would also allow flexing between the individual units to compensate for uneven ground contour as the apparatus travels over a field to be conditioned.

As earlier noted, the coulter disks 18 and 20 are concave in shape to trap and deflect the soil as it accelerates around the shank of the subsoiler 14. Each disk includes respective support brackets 22 and 24 which are vertically adjustable via locking pins. As best shown in FIG. 1, coulter disk 18 is rotatably secured to a lower bracket portion 48 which telescopically interfits within the main support bracket 22 and is locked into place by adjustment pin 50. Returning to FIG. 2, each disk is also provided with a lateral adjustment mechanism 52 and 54 respectively. Lateral disk adjustment mechanisms 52 and 54 include pivot plates with screws to vary the angular positioning of the disks about a vertical plane. This angular positioning of each disk is critical for producing a raised planting bed for the seeds to be deposited in. Disk 20 is likewise critically positioned forward of disk 18 to produce an overlap of the two streams of soil as they pass over subsoiler 14. This overlap causes the two streams to collide providing enhanced mixing of the soil prior to forming the seedbed. It is critical that one of brackets 22 and 24 be positioned forward of the other bracket. The positioning is preferably from two to five inches forward of the other disk.

The second pressure means 12, which exerts a force against the soil about one third that of first pressure means 10 functions to firm and tap down the conditioned soil which has been funnelled between the disks 18 and 20 into a raised seedbed suitable for planting. The first and second pressure means preferably include tire treads which function to not only help create a firm seedbed but also to crimp any residue remaining on the surface in such a manner as to corrugate it and force it into the face of the seedbed thereby providing a wicking means to draw moisture into the soil. The seedbed is disposed approximately 2 inches above the surface of the surrounding soil.

Immediately following second pressure means 12 are planter wheels 56 and 58 which deposit and cover a seed in the seedbed. Bracket pivot 29 is articulated to allow the planter to accurately track behind the apparatus A as it moves down a row. This ability of the planter 26 to track behind the device is particularly advantageous when making short turns in the field.

Figure 4:
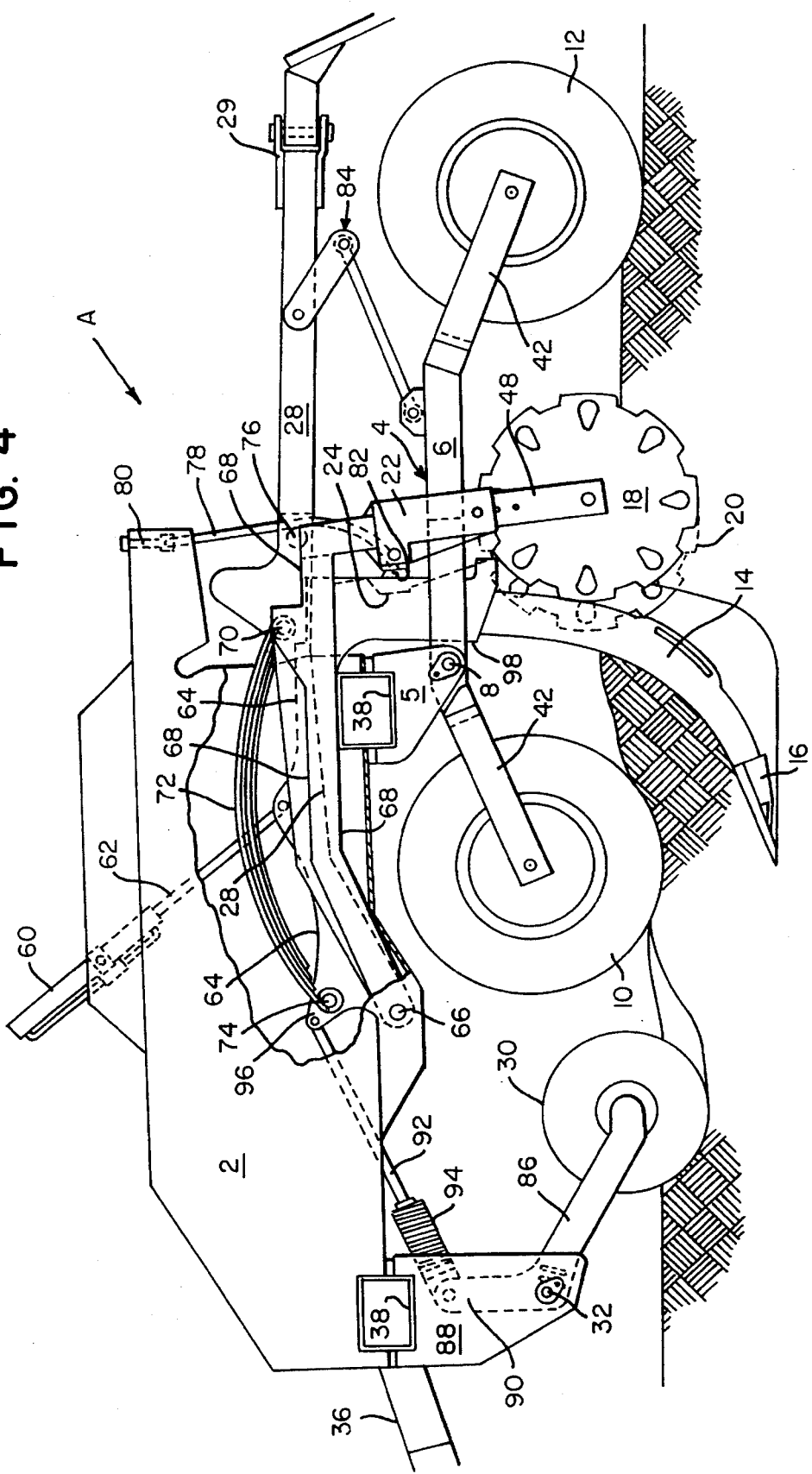
FIG. 4 is a side elevational view of the device shown in FIG. 3 with the subsoiler, coulter disks and planter inserted into the ground during operation to illustrate the relationship of the parts during operation and with portions shown in hidden lines.

Turning now to FIGS. 3 and 4, the mechanism for raising and lowering the various components during use is shown in greater detail. As best shown in FIG. 3, portions of main frame 2 are broken away to expose a cylinder means 60 of the hydraulic or pneumatic type which operates a piston (not shown) and rod 62. A hydraulic fluid circuit is also provided (not shown) with appropriate valves and reservoirs to remotely operate the cylinder means 60 during use.

The cylinder means 60 is secured to the main frame 2 with one end of rod 62 pivotally attached to a subsoiler linkage arm 64. A first end of linkage arm 64 is pivotally secured to the main frame 2 at main pivot 66 which extends laterally through the apparatus A. The opposite, second end of linkage arm 64 is connected to the subsoiler shank 14. The disk support brackets 2 and 24 are positioned on either side of subsoiler 14. A first disk linkage arm 68 is pivotally secured to main pivot 66. A second disk linkage arm (not shown) is also provided for disk 20 and bracket 24 and is positioned on the opposite side of subsoiler linkage arm 64 and is connected to main pivot 66 in a similar manner. Thus, disks 18 an 20 and ripper 14 are raised and lowered from a single main pivot 66. While a first end of disk linkage arm 68 is pivotally secured to main pivot 66, the second end is affixed to one end of leaf spring 72 via lateral connecting bar 76. The opposite end of leaf spring 72 is affixed to the subsoiler linkage arm 64 at second lateral connecting bar 74. The planter support bracket 28 is likewise affixed to main pivot 66 at the end opposite the seed deposit and covering means 26. Planter support bracket 28 further includes a roller means 76 extending laterally from each side of support bracket 28. The roller means 76 is associated with a chain means 78 affixed at a first end via bracket 80 to the top of main frame 2 and at a second end to connection point 82 on linkage arm 64. When the apparatus is in the raised position as shown in FIG. 3, the chain loops underneath the roller means 76 thereby supporting planter bracket 28 and planter 26 in a position raised from the ground. When in the lowered position as shown in FIG. 4, the chain 78 is gradually released from roller means 76 allowing the planter bracket 28 to descend to the ground.

First cutting means or disk 30 is rotatably secured at a first end to cutting disk support arm 86. The support arm 86 is pivotally secured at pivot rod 32 to frame extension 88 at the front of the apparatus A. The pivot 32 also provides lateral movement to disk 30 in the event it contacts an obstruction. The opposite end 90 of support arm 86 is pivotally connected to rod 92, the other end of which is pivotally secured to subsoiler linkage arm 64 at flange 96. As can be appreciated, pivotal movement of subsoiler linkage arm 64 about pivot 66 will likewise cause upward or downward movement of first cutting disk 30 via support arm 86 and rod 92. A heavy duty coil spring 94 is affixed to the rod 92 to apply a force against cutting disk support arm 86 and thereby allowing the disk to override obstacles within its path while quickly reinserting itself into the soil. If no cutting means is required, the above described mechanism is not provided to the apparatus.

In operation, strip tillage apparatus A is transported to a site to be conditioned and planted with each of the earth working elements thereof in a raised position as shown in FIG. 3. While in the raised condition, the main suspension means 4 including first and second pressure means 10, 12 functions to support and allow transport of the entire apparatus independent of the secondary suspension means which supports all the earth working implements operated by cylinder 60. To condition a strip of soil and create a seedbed sufficient for planting, the cylinder means 60 is actuated to urge the piston rod 62 into an extended position as shown in FIG. 4. The subsoiler linkage arm 64 pivots about main pivot 66 in a downward arc thereby entering the soil as the apparatus A moves forward. When the subsoiler linkage arm 64 is urged downwardly, the pressure on leaf spring 72 increases to a point at which sufficient force is exerted against disk linkage arm 68 to force arm 68 downwardly and urge the respective disk 18 into the ground and into a position behind the subsoiler 14 at the selected depth. It is to be understood that although a single leaf spring 72 is illustrated with respect to disk linkage arm 68 and coulter disk 18, a second leaf spring (not shown) is provided and positioned on the side opposite subsoiler linkage arm 64 for connection to a separate disk linkage arm (not shown) and coulter disk 20. Although subsoiler linkage arm 64 and disk linkage arm 68 and support 28 are all connected to a single main pivot 68, each pivots independent of the other.

Toward the end of the cylinder stroke, planter support bracket 28 is released from chain 78 thereby allowing the support bracket 28 to descend into a lowered position as shown in FIG. 4. Since the chain means 78 is secured at support mount 82 of subsoiler linkage arm 64, when the subsoiler linkage arm 64, descends, the chain 78 is gradually passed around roller means 76 thereby lowering planter support bracket 28 into a ground engaging position. A secondary linkage 84 acts to stabilize the planter support bracket 28 against lateral movement and to provide additional overall support between the support bracket 28 and walking beam 6 while in a lowered position.

As the strip tiller apparatus A travels along the surface of the ground, the first cutting disk 30 will precut a vertical slit in the ground to allow the subsoiler 14 to more readily enter the ground to break up and penetrate the soil and to cause an eruption of soil which flows upwardly and outwardly over the sides of the subsoiler. If no cutting means or trash clearing means is employed, the subsoiler directly enters the soil to create an eruption furrow. The positioning of the tooth 16 at a point underneath the first pressure means 10 ensures that the soil does not burst from the ground forwardly and in an uncontrolled manner but in a relatively restricted fashion since the first pressure means 10 exerts a considerable force against the soil as it is worked up by the subsoiler 14. Thus, the means for supporting and carrying the machine also functions as an integral part of the tillage operation, i.e. controls the flow of soil as it is conditioned by the subsoiler 14. Fertilizer means 34 may deposit fertilizer behind the shank 14 during use thereby directly applying nutrients into the seedbed.

As the soil wakes pass over each side of the subsoiler shank 14, the soil flows toward the coulter disks 18 and 20 which are angularly disposed to divert the soil as it passes around the subsoiler shank 14, causing it to accelerate and collide. The soil is thus intermixed at a high rate of speed thereby creating a loose, friable soil mound. The second pressure means 12 which exerts a pressure one third of first pressure means 10 will then gently tamp down the raised row of conditioned soil exiting the coulter disks 18 and 20 to thereby form a raised and level, smooth seedbed. In addition, any trash or debris from crops is caused to turn inwardly into the soil due to the action of the paired coulter disks 18 and 20 as well as the thick intermeshing tire treads on second pressure means 12. At least some of the debris and trash is intermixed within the soil and below the surface as it travels with the soil around the subsoiler 14 and between disks 18 and 20. Again, the means for supporting and carrying the machine i.e. the second pressure means assists in the tillage operation.

Trash and debris are inserted downwardly into the ground along the sides of the seedbed with portions above the surface as well as completely underneath the surface, thereby increasing moisture retention within the seedbed and improving overall crop yield. The trash and debris is "butt-fed" into the ground by the present invention, thereby eliminating accumulation of floating trash around the subsoiler and the coulter disks. As the first pressure means 10 travels over the debris and trash, it flattens the tops forward against the surface of the soil without uprooting the lower ends. In this manner it is held in place immediately prior to being intermixed with and fed into the soil. Applicant has found the present invention will dramatically reduce the accumulation of debris against the subsoiler and coulter disks since loose debris is eliminated. The seed deposit and covering means 26 will then travel over the level, conditioned seedbed to create a small furrow, deposit a seed and cover it.

An additional feature of the present invention is provided to assist the subsoiler 14 in bypassing underground obstacles such as rocks or boulders which may collide with the subsoiler 14 during operation. For example, if the subsoiler tooth 16 either hangs up or hits a rock in the soil, the hydraulic pressure of cylinder means 60 begins to build in the cylinder. A release valve arrangement is provided (not shown) to the main hydraulic line providing fluid to the cylinder. The relief valve may comprise two separate relief valves and a one-way check valve. The relief valves and the one-way check valves are preset to allow the excessive pressures which build up within the line during collision to be vented thereby allowing the subsoiler to automatically lift until it bypasses the obstruction. The valves then allow fluid pressure to quickly rebuild back into the line causing the cylinder 60 to expand thereby urging the subsoiler 14 back into the ground.

Figure 5:
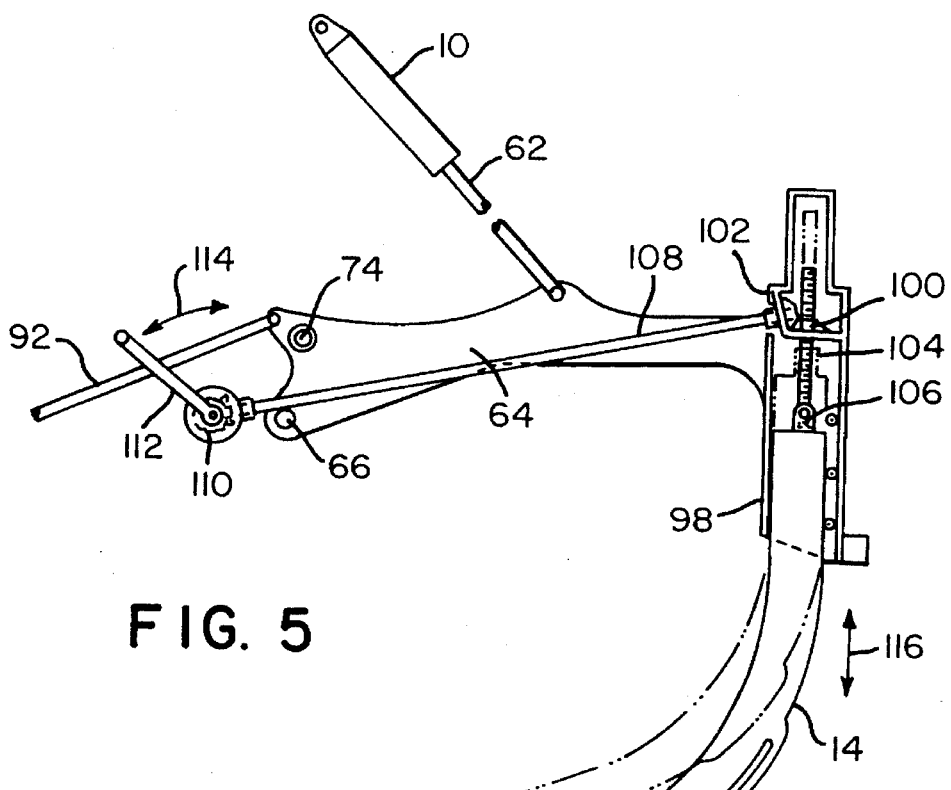
FIG. 5 is an enlarged, fragmentary side elevational view of a depth adjustment mechanism for the subsoiler.
Figure 6:
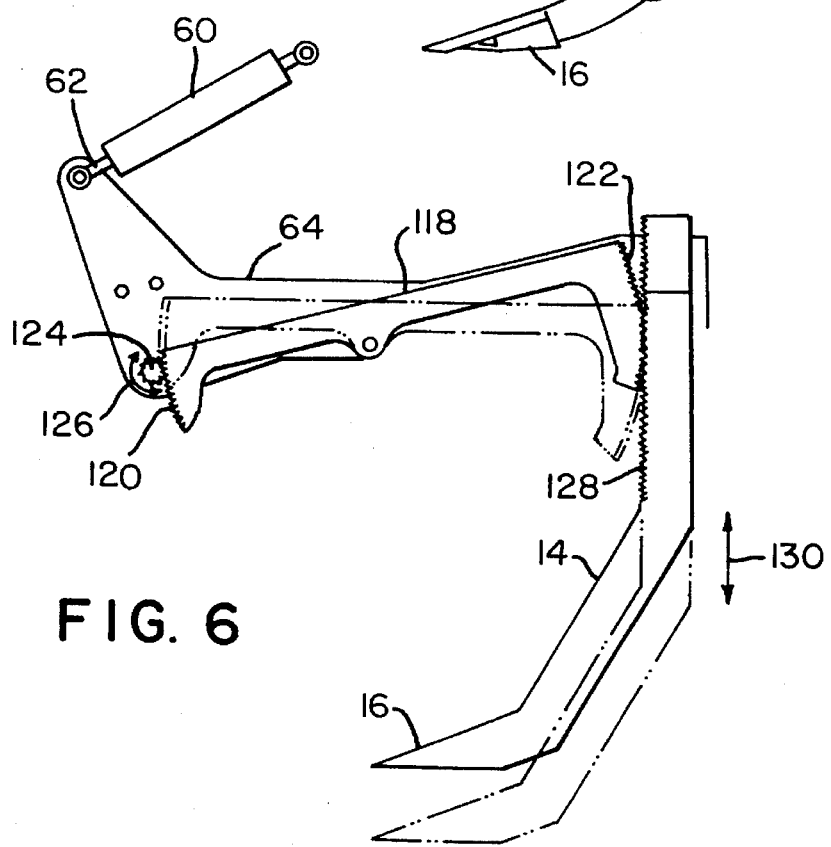
FIG. 6 is an enlarged, fragmentary side elevational view of another embodiment for the depth adjustment mechanism.

Turning now to FIGS. 5 and 6, a depth adjustment means for varying the depth of penetration of subsoiler 14 is shown. FIG. 5 depicts a subsoiler 14 including tooth 16 movably positioned within shank housing 98 affixed to the second end of the subsoiler linkage arm 64. The shank housing contains first and second bevel gears 100 and 102. The first bevel gear 100 includes a traveling screw or rod 104 extending therethrough, one end of which is affixed at 106 to the upper portion of subsoiler shank 14. The second bevel screw 102 is connected to rod 108, the opposite end of which includes a second pair of bevel gears 110 which are rotated by handle 112. As can be appreciated, rotation of handle 112 in either direction indicated by arrow 114, causes subsequent rotation of rod 108 and rotation of bevel gear 102 against bevel gear 100. Since bevel gear 100 rotates in a fixed position, the threaded traveling screw 104 will move either up or down as it moves through bevel gear 100. This causes movement of shank 14 in either direction as indicated by arrow 116.

Depending upon the desired soil depth to be conditioned, the subsoiler 14 can therefore be selectively raised or lowered several inches in either direction as shown by phantom lines.

An alternate embodiment of adjustment is shown in FIG. 6. Subsoiler linkage arm 64 is provided with a freely pivoting rack 118 provided with teeth at a first end 120 and second end 122. A pinion gear 124 is mounted to subsoiler linkage arm 64 adjacent to rack first end 120 and is engageable therewith. A handle or other actuation means (not shown) is provided to cause rotation of pinion gear 124 in either direction indicated by arrow 126. As can be appreciated, rotation of pinion gear 124 will cause the rack 118 to pivot in an opposite direction at second end 122 and as shown in phantom lines. Second end 122 is engageable with gear teeth 128 on the vertical disposed portion of subsoiler shank 14. Since the subsoiler shank 14 is mounted in a suitable shank housing (not shown) which allows vertical movement therein, the action of rack 118 will urge travel of subsoiler 14 in either an upwards or downwards direction as indicated by arrow 130. The repositioning of subsoiler 14 is shown in phantom lines. As can be appreciated, either a manual hand crank or pneumatic means can be used in either embodiment to cause movement of shank 14. Also, in a multi-row apparatus, bevel gear 110 (FIG. 5) and pinion gear 124 (FIG. 6) operate off a single shaft (not shown) which extends between and is connected to each depth adjustment means for each subsoiler. This ensures that each row is planted at a depth identical to the adjacent rows.

COMPARATIVE EXAMPLE

The interaction of poultry litter application prior to corn planting with various prior art tillage practices as well as the present invention was evaluated on six runoff plots (RS80-RS85) sited in a field having been in sod cover for a number of years. Plot characteristics are shown in Table 1. Plots were paired with respect to tillage practice, i.e., no-tillage, conventional tillage, and strip tillage according to the present invention. One plot in each pairing received no litter, while turkey litter was broadcast by hand the day before the first demonstration run at the rate of 5600 kg/ha (2.5 tons/acre) with a concentration of 2.1% plant-available N and 3.2% plant-available $P_2O_5$. The plots receiving no litter were supplied with 275 kg/ha (300 lb/ac) ammonium nitrate and 310 kg/ha (350 lb/ac) triple super phosphate. Therefore, all six plots received a rate of approximately 118 kg/ha (105 lb/ac) N and 177 kg/ha (158 lb/ac) $P_2O_5$. The conventional tillage plots were immediately tilled after the turkey litter and commercial fertilizer applications to incorporate the material into the soil.

The rainfall simulator used in this study was designed to apply rainfall at an intensity approaching 50 mm/hr in three different applications over a two day period. A normal rainfall sequence consisted of a 1 h run (R1), followed 24 h later by a 0.5 h run (R2), and an additional 0.5 h run (R3) after a 0.5 h rest interval. The three run sequence were used to represent dry, wet, and very wet soil conditions and all are commonly used artificial rainfall sequence for erosion research. This sequence was used at all six sites.

Rainfall simulator application rates, amounts, and uniformity were measured by placing 2 to 4 rain gages within each plot depending on plot size. Rain gages were read after each application to determine the amount of rainfall and the uniformity of application. Runoff was collected at the base of each plot and channeled through a 150 mm H-flume equipped with a 150 mm stilling well and a FW-1 stage recorder.

Water quality samples were collected manually at 3 to 12 min intervals during the rainfall-runoff events. Water quality samples were iced down immediately after collection and stored at 0° to 5° C. until analyzed. Samples from all sites were analyzed for total suspended solids (TSS), total phosphorus ($P_t$), orthophosphorous ($PO_4$), nitrate ($NO_3$), Total Kjeldahl nitrogen (TKN), filtered $P_t$($P_{tf}$), filtered TKN ($TKN_f$), and ammonium ($NH_4$). Total N($N_t$) was obtained by summing $NO_3$ and TKN. Table 3 sets forth average sediment and nutrient concentrations. Water quality analyses were performed using standard analytical procedures (USEPA, 1979).

The response of the plots treated by the present apparatus and method produced marked improvements with respect to runoff and sediment. The average runoff from these plots (RS84 and RS85) was only 7% more than that measured from the conventional tillage plots (RS82 and RS83) while being 22% less than that obtained from the no-tillage plots (RS80 and RS81). The effect on sediment losses was even more impressive with the average sediment loss from RS84 and RS85 being reduced by 85% compared to RS82 and RS83 and 51% compared to RS80 and RS81. See Table 2.

TABLE 1

PLOT CHARACTERISTICS

| Treatment (Plot) | Area (m²) | Slope (%) | Soil Type | Rainfall (mm) |
|---|---|---|---|---|
| No-till w/litter (RS80) | 45 | 14 | Rabun clay loam | 98 |
| No-till w/fertilizer (RS81) | 45 | 14 | Rabun clay loam | 96 |
| Conventional till w/litter (RS82) | 45 | 14 | Rabun clay loam | 91 |
| Conventional till w/fertilizer (RS83) | 45 | 14 | Rabun clay loam | 91 |
| Row-till w/litter (RS84) | 45 | 14 | Rabun clay loam | 93 |
| Row-till w/fertilizer (RS85) | 45 | 14 | Rabun clay loam | 99 |

TABLE 2

SEDIMENT, NUTRIENT AND RUNOFF YIELD (Areal Basis)

| Plot | TSS kg/ha | NH$_4$ kg/ha | NO$_3$ kg/ha | TKN kg/ha | N$_t$ kg/ha | TKN$_f$ kg/ha | P$_t$ kg/ha | PO$_4$ kg/ha | P$_{tf}$ kg/ha | RO kg/ha |
|---|---|---|---|---|---|---|---|---|---|---|
| RS80 | 81.8 | 7.907 | 0.039 | 12.325 | 12.361 | 10.794 | 1.447 | 0.837 | 0.997 | 425.2 |
| RS81 | 49.5 | 2.166 | 1.851 | 3.061 | 4.913 | 2.575 | 1.903 | 1.651 | 1.578 | 267.8 |
| RS82 | 144.2 | 2.338 | 0.065 | 4.357 | 4.417 | 3.365 | 0.448 | 0.050 | 0.095 | 176.3 |
| RS83 | 297.1 | 3.210 | 4.590 | 5.169 | 9.761 | 3.567 | 1.044 | 0.351 | 0.400 | 330.5 |
| RS84 | 34.4 | 3.653 | 0.155 | 6.062 | 6.217 | 4.926 | 0.568 | 0.269 | 0.362 | 249.9 |
| RS85 | 30.1 | 1.926 | 2.829 | 2.747 | 5.574 | 2.422 | 0.960 | 0.865 | 0.859 | 293.4 |

TABLE 3

AVERAGE SEDIMENT AND NUTRIENT CONCENTRATIONS

| Plot | TSS kg/ha | NH$_4$ kg/ha | NO$_3$ kg/ha | TKN kg/ha | N$_t$ kg/ha | TKN$_f$ kg/ha | P$_t$ kg/ha | PO$_4$ kg/ha | P$_{tf}$ kg/ha |
|---|---|---|---|---|---|---|---|---|---|
| RS80 | 192.4 | 18.59 | 0.09 | 28.99 | 29.07 | 25.39 | 3.40 | 1.97 | 2.34 |
| RS81 | 184.9 | 8.09 | 6.91 | 11.43 | 18.34 | 9.61 | 7.11 | 6.17 | 5.89 |
| RS82 | 818.5 | 13.26 | 0.37 | 24.71 | 25.05 | 19.08 | 2.54 | 0.28 | 0.54 |
| RS83 | 899.0 | 9.71 | 13.89 | 15.64 | 29.54 | 10.79 | 3.16 | 1.06 | 1.21 |
| RS84 | 137.8 | 14.62 | 0.62 | 24.25 | 24.88 | 19.71 | 2.27 | 1.08 | 1.45 |
| RS85 | 102.7 | 6.22 | 9.64 | 9.36 | 18.99 | 8.25 | 3.27 | 2.95 | 2.93 |

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

I claim:

1. An integrated movable row crop soil conditioner for conditioning soil prior to planting, said integrated movable row crop soil conditioner comprising:

a) carrying means for supporting and moving said row crop soil conditioner along a row to be planted, said carrying means including at least one wheel contacting the soil;

b) tillage means supported by said carrying means for conditioning said soil as said row crop soil conditioner moves along a row to be planted;

c) means for positioning said tillage means and said at least one wheel in longitudinal alignment so that said tillage means follows the directional path of said at least one wheel said carrying means functioning as part of the soil conditioning operation while supporting and moving said row crop soil conditioner along a row to be planted; and d) means for moving said tillage means into and out of engagement with said soil while said at least one wheel remains engaged with said soil.

2. A row crop soil conditioner as in claim 1 and further including planting means attached to said carrying means, said planting means being longitudinally aligned behind said tillage means.

3. A row crop soil conditioner as in claim 1 wherein;
said tillage means may be raised and lowered relative to said carrying means.

4. A movable crop soil conditioning apparatus as in claim 3, wherein a series of ground engaging tools which are laterally connected rotate about said single pivot point to engage said soil.

5. A row cop soil conditioner as in claim 1 wherein;
multiple single row units are laterally connected to said integrated single row unit for simultaneously conditioning soil along multiple parallel rows.

6. A row crop soil conditioner as in claim 5 and further comprising
adjustment means for adjusting a depth of said tillage means.

7. A row crop conditioner as in claim 1 further comprising:
a) means for cutting a row length furrow opening into said soil or clearing a path in said soil when said soil conditioner is moved;
b) subsoiler means positioned behind said cutting or clearing means for pushing said soil forward and upward creating soil wakes and an eruption furrow as said soil conditioner is moved;
c) first pressure means for maintaining pressure on said soil as it is pushed forwardly and upwardly by said subsoiler means; and
d) means for turning said soil wakes inwardly towards each other to crush and shear said soil and downwardly into said eruption furrow to close said eruption furrow producing conditioned soil.

8. A movable crop soil conditioning apparatus as in claim 1, where said tillage means further comprise:
subsoiler means for penetrating and breaking said soil to form soil wakes as said row crop soil conditioner is moved;
turning means for turning said soil wakes inwardly towards each other to crush and shear said soil; and
planting means being positioned behind said turning means for planting, wherein
said subsoiler means, said turning means and said planting means each rotate about a single pivot point to move into and out of engagement with said soil,
said turning means and said planting means each rotating about said single pivot point based on a position of said subsoiler means.

9. A movable crop soil conditioning apparatus as in claim 1, where said tillage means further comprise:
subsoiler means for penetrating and breaking said soil to form soil wakes as said row crop soil conditioner is moved; and
turning means for turning said soil wakes inwardly towards each other to crush and shear said soil; wherein
said subsoiler means and said turning means each rotate about a single pivot point to move into and out of engagement with said soil,
said turning means rotating about said single pivot point based on a position of said subsoiler means.

10. A movable crop soil conditioning apparatus as in claim 1, wherein:
said carrying means are comprised of tires for crushing and shearing soil which is being conditioned by said tillage means; and
said tillage means are comprised of:
cutting means for cutting said soil when said conditioning apparatus is moved,
a subsoiler shank positioned behind said cutting means for breaking said soil to form soil wakes when said soil conditioner is moved, and
coulter disks for receiving said soil wakes from said subsoiler shank and for turning said soil wakes inwardly towards each other to crush and shear said soil,
said cutting means, subsoiler shank, said coulter disks and said carrying means being sequentially aligned.

11. A movable crop soil conditioning apparatus as in claim 1, where said carrying means include weight bearing tires having a corrugated surface with bars extending therefrom for shearing and crushing said soil by providing points of pressure and release.

12. A movable crop soil conditioning apparatus as in claim 1, where said carrying means include a first and second tire, said first tire being positioned before said tillage means and said second tire being positioned after said tillage means.

13. An integrated, movable row crop soil conditioner for conditioning soil prior to planting comprising:
a) subsoiler means for penetrating and breaking said soil to form soil wakes as said row crop soil conditioner is moved;
b) turning means for turning said soil wakes inwardly towards each other to crush and shear said soil; and
c) planting means being positioned behind said turning means for planting,
said subsoiler means, said turning means and said planting means rotating about a single pivot point to move into and out of engagement with said soil, said turning means and said planting means rotating about said single pivot point based on a position of said subsoiler means.

14. A row crop soil conditioner as in claim 13, wherein
said planting means independently move into and out of engagement with said soil after being rotated about said single pivot point into a lowered position.

15. A row crop soil conditioner as in claim 13, wherein said means for turning comprise a pair of inwardly curved coulter disks which are adjustably offset from each other, a first disk of said pair positionable from about 2 inches to about 5 inches forward of a second disk of said pair.

16. A row crop soil conditioner as in claim 13, wherein said subsoiler means includes piston means for raising and lowering said subsoiler means.

17. A row crop soil conditioner as in claim 16, wherein said subsoiler means further includes pressure release means for preventing tooth breakage upon impact against hard obstacles.

18. A row crop soil conditioner as in claim 17, wherein said pressure release means include relief valve means for bleeding fluid from said piston when said subsoiler impacts against one of said hard obstacles.

19. A row crop soil conditioner as in claim 13, further comprising:
first pressure means for maintaining pressure on said soil over said subsoiler means when said subsoiler means is inserted into said soil;

second pressure means for tamping down said soil turned by said turning means;

a frame being longitudinally aligned with said subsoiler means;

main suspension means connected to said frame, said main suspension means being independently movable and including said first and second pressure means;

secondary suspension means connected to said frame for simultaneously moving said subsoiler means and said turning means between a raised transport position and a lowered ground engaging position, said secondary independent suspension means comprising a linkage arm having first and second ends, said linkage arm first end being pivotally connected to said main unit frame and said linkage arm second end being secured to said subsoiler means; and piston means including first and second ends, said piston means first end being secured to said frame and said piston means second end being secured to said linkage arm at a location space from said linkage arm first end, actuation of said piston means causing said linkage arm to pivot about said linkage arm first end to raise and lower said subsoiler means.

20. A row crop soil conditioner as in claim 19, further comprising:

spring means secured to said linkage arm for biasing said turning means when said turning means are lowered into said soil.

21. A row crop soil conditioner as in claim 19, further comprising:

means for coupling a seed planter unit behind said frame, said means for coupling being connected to said secondary suspension means and being movable therewith; and chain and roller means for lifting said secondary independent suspension means to said raised transport position, said chain and roller means including chain means having first and second ends, said chain means first end being secured to said frame and said chain means second end being secured to said linkage arm second end, said chain means being releasably engageable with roller means which are secured to said means for coupling said seed planter unit, whereby actuation of said piston means to raise said subsoiler causes engagement of said chain means with said roller means to subsequently lift said means for coupling.

22. A row crop soil conditioner as in claim 19, further including:

cutting means for cutting a row length furrow opening in said soil when said soil conditioner is moved, said cutting means including a cutting disk which is pivotally secured to said frame, and a spring biased linkage rod secured at a first end to said cutting disk and at a second end to said linkage arm first end, whereby actuation of said piston means to raise said subsoiler causes said linkage rod to raise said cutting disk about said frame pivot while actuation of said piston to lower said subsoiler causes said linkage rods to lower said cutting disk about said frame pivot to cut a row length furrow opening in said soil.

23. A row crop soil conditioner as in claim 13, further comprising:

adjustment means for adjusting a depth of soil penetration of said subsoiler means independently from said planter means and said turning means, said adjustment means comprising rack and pinion gears secured to said subsoiler for incrementally adjusting said depth of said subsoiler means.

24. A row crop soil conditioner as in claim 13, further comprising:

adjustment means for varying a depth of soil penetration of said subsoiler, said adjustment means comprising traveling screw gear means secured to said subsoiler for incrementally adjusting said depth.

25. A row crop soil conditioner as in claim 13, further including carrying means for supporting and moving said row crop soil conditioner along a row to be planted, said carrying means functioning as part of the soil conditioning operation while supporting and moving said row crop soil conditioner along a row to be planted.

26. A row crop soil conditioner as in claim 25, wherein said carrying means comprise weight bearing tires having a corrugated surface with bars extending therefrom for shearing and crushing said soil by providing points of pressure and release.

27. A row crop soil conditioner as in claim 25, wherein said carrying means include first and second tires, said first tire being positioned before said subsoiler means, said second tire being positioned after said turning means.

28. A movable crop soil conditioning apparatus for conditioning soil including multiple independent row unit assemblies which are arranged in parallel, each of said independent row unit assemblies comprising:

cutting means for cutting said soil when said conditioning apparatus is moved;

subsoiler means, positioned behind said cutting means, for breaking said soil to form soil wakes when said soil conditioner is moved;

disk means for receiving said soil wakes from said subsoiler means and for turning said soil wakes inwardly towards each other to crush and shear said soil;

seedbed means for making a seedbed from said crushed and sheared soil; and planting means for planting seeds in said seedbed, said subsoiler means, said disk means, said seedbed means and said planting means being sequentially aligned.

29. A movable crop soil conditioning apparatus as in claim 28, wherein each of said independent row unit assemblies further comprises:

carrying means for supporting and moving said independent row unit assembly along a row to be planted, said carrying means being longitudinally aligned with said cutting means, said subsoiler means and said disk means, where said carrying means functions as part of the soil conditioning operation while supporting and moving said row crop soil conditioner.

30. A movable crop soil conditioning apparatus as in claim 28, wherein said subsoiler means, said disk means and said planting means in each of said independent row unit assemblies rotate about a single pivot point to move into and out of engagement with said soil, said disk means and said planting means each rotating about said single pivot point based on a position of said subsoiler means.

31. A movable crop soil conditioning apparatus as in claim 28, wherein said subsoiler means and said disk means in each of said independent row unit assemblies rotate about a single pivot point to move into and out of engagement with said soil, said disk means rotating about said single pivot point based on a position of said subsoiler means.

32. A movable crop soil conditioning apparatus as in claim 28, wherein said seedbed means include weight bearing tires having a corrugated surface with bars extending therefrom for shearing and crushing said soil by providing points of pressure and release.

33. A movable crop soil conditioning apparatus as in claim 28, wherein said seedbed means include first and second tires, said first tire being positioned before said subsoiler means, said second tire being positioned after said disk means.

* * * * *